(12) United States Patent
Kamiyama (10) Patent No.: US 10,953,689 B2
(45) Date of Patent: Mar. 23, 2021

(54) VEHICLE WHEEL

(71) Applicant: HONDA MOTOR CO., LTD., Tokyo (JP)

(72) Inventor: Youichi Kamiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 304 days.

(21) Appl. No.: 16/084,458

(22) PCT Filed: Mar. 16, 2017

(86) PCT No.: PCT/JP2017/010799
§ 371 (c)(1),
(2) Date: Sep. 12, 2018

(87) PCT Pub. No.: WO2017/159829
PCT Pub. Date: Sep. 21, 2017

(65) Prior Publication Data
US 2019/0077189 A1 Mar. 14, 2019

(30) Foreign Application Priority Data

Mar. 16, 2016 (JP) .............................. JP2016-052012

(51) Int. Cl.
*B60B 21/02* (2006.01)
*B60B 21/12* (2006.01)
(Continued)

(52) U.S. Cl.
CPC .............. *B60B 21/02* (2013.01); *B60B 21/12* (2013.01); *B60C 19/002* (2013.01);
(Continued)

(58) Field of Classification Search
CPC ....... B60C 19/002; B60B 21/02; B60B 21/12; G10K 11/161
See application file for complete search history.

(56) References Cited

U.S. PATENT DOCUMENTS

2014/0346842 A1* 11/2014 Kamiyama ............. B60B 21/12
301/5.1
2014/0346843 A1* 11/2014 Kamiyama ............. B60B 21/12
301/5.1
(Continued)

FOREIGN PATENT DOCUMENTS

JP 2009-051304 A 3/2009
JP 2009-107357 A 5/2009
(Continued)

OTHER PUBLICATIONS

International Search Report by ISA/JP dated Jun. 20, 2017, PCT/JP2017/010799 (7 pages).
(Continued)

*Primary Examiner* — Kip T Kotter
(74) *Attorney, Agent, or Firm* — Rankin, Hill & Clark LLP (57) ABSTRACT

A sub-air chamber member includes: a lower surface portion disposed proximate to the outer circumferential surface of the well portion; an upper surface portion disposed radially outside of the lower surface portion; a pair of edge portions engaging with the well portion. A space portion is positioned above the upper surface portion, the space portion being formed by a part of the upper surface portion and an inner wall surface of the well portion. A strong axis of principal axes of a section of the sub-air chamber member perpendicular to an axis of the sub-air chamber member is inclined by a first predetermined angle relative to a wheel width direction Y.

2 Claims, 5 Drawing Sheets (51) Int. Cl.
*B60C 19/00* (2006.01)
*G10K 11/172* (2006.01)

(52) U.S. Cl.
CPC ........... *B60B 21/025* (2013.01); *B60B 21/026* (2013.01); *B60B 21/028* (2013.01); *B60B 2900/131* (2013.01); *B60B 2900/133* (2013.01); *G10K 11/172* (2013.01)

(56) References Cited

U.S. PATENT DOCUMENTS

| | | | |
|---|---|---|---|
| 2016/0016430 A1* | 1/2016 | Kamiyama | ........... B60C 19/002 301/95.104 |
| 2016/0082769 A1* | 3/2016 | Ishii | ...................... B60B 21/026 301/63.101 |
| 2017/0021666 A1* | 1/2017 | Kamiyama | ............. B60B 21/12 |
| 2017/0096028 A1* | 4/2017 | Kamiyama | ........... B60C 19/002 |
| 2018/0022151 A1 | 1/2018 | Kamiyama | |

FOREIGN PATENT DOCUMENTS

| | | |
|---|---|---|
| JP | 2014-226992 A | 12/2014 |
| JP | 2015-058853 A | 3/2015 |
| JP | 2015-174502 A | 10/2015 |
| JP | 2015-174503 A | 10/2015 |
| WO | 2016143533 A1 | 9/2016 |

OTHER PUBLICATIONS

Written Opinion by ISA/JP dated Jun. 20, 2017, on PCT/JP2017/010799 (4 pages).

* cited by examiner

FIG.4A (COMPARATIVE EXAMPLE 1)

FIG.4C (COMPARATIVE EXAMPLE 3)

FIG.4B (COMPARATIVE EXAMPLE 2)

FIG.4D (PRESENT EMBODIMENT)

FIG.5

VEHICLE WHEEL

TECHNICAL FIELD

The present invention relates to a vehicle wheel.

BACKGROUND ART

To reduce road noise caused by pipe resonance in a tire air chamber, various wheels have been conventionally proposed which are provided with Helmholtz resonators (sub-air chamber members) each having a sub-air chamber that communicates with the tire air chamber via a communication hole.

The sub-air chamber member includes a main body part which has a sub-air chamber inside and which is formed long in the wheel circumferential direction (see, for example, Patent Literature 1). The main body part is formed by an upper plate, a bottom plate, and a pair of side plates that extend up outward in the wheel radial direction from the respective edges of the bottom plate in the wheel width direction.

CITATION LIST

Patent Literature

Patent Literature 1: Japanese Patent Application Publication No. 2015-174502

SUMMARY OF INVENTION

Technical Problem

In order for the sub-air chamber member to produce a sufficient muffling function, it is desirable that the sub-air chamber have a large volume. This is because when the sub-air chamber is small in volume, the effectiveness of muffling the pipe resonance sound in the tire air chamber lowers, which prevents a sufficient reduction in the road noise caused by the pipe resonance sound in the tire air chamber.

The sub-air chamber member disclosed in Patent Literature 1 is disposed such that the strong axis of the principal axes of a section of the sub-air chamber member is in parallel with or substantially in parallel with the wheel width direction. Thus, when the bottom plate of the sub-air chamber member is lowered inward in the wheel radial direction to increase the volume of the sub-air chamber, a rim line may be interfered with. Also, considerations need to be made not to degrade the tire mountability for attachment of a tire to the wheel.

A general objective of the present invention is to provide a vehicle wheel allowing a sub-air chamber member to be suitably disposed along a curvy rim line, while creating a space portion for use in attachment of a tire to the wheel and not reducing the volume of a sub-air chamber.

Solution to Problem

To achieve the above objective, the present invention is a vehicle wheel having a sub-air chamber member of a Helmholtz resonator attached to an outer circumferential surface of a well portion, characterized in that the sub-air chamber member comprises a lower surface portion disposed proximate to the outer circumferential surface of the well portion, an upper surface portion disposed radially outside of the lower surface portion, a sub-air chamber formed between the upper surface portion and the lower surface portion, and a first edge portion and a second edge portion that connect the lower surface portion and the upper surface portion to each other at respective sides in a width direction and engage with the well portion, a space portion is positioned above the upper surface portion, the space portion being formed by a part of the upper surface portion and an inner wall surface of the well portion, and a strong axis (PA1) of principal axes of a section of the sub-air chamber member perpendicular to an axis of the sub-air chamber member is inclined by a first predetermined angle (θ1) relative to a wheel width direction.

According to the present invention in which the strong axis (PA1) of the principal axes of a section of the sub-air chamber member perpendicular to the axis of the sub-air chamber member is inclined by the first predetermined angle (θ1) relative to the wheel width direction, the space portion is created above the upper surface portion, and also, the sub-air chamber has a sufficient volume. Thus, these two elements is brought into balance.

Further, according to the present invention in which the sub-air chamber member is inclined, the sub-air chamber member can be readily attached along the outer circumferential surface of the rim (i.e., the rim line) curving inward in the wheel radial direction. As a result, the present invention allows the sub-air chamber member to be suitably disposed along the curvy rim line while creating the space portion for use in attachment of a tire to the wheel and not reducing the volume of the sub-air chamber.

In addition, the present invention is characterized in that when an inclination angle at which an imaginary straight line passing through the first edge portion and the second edge portion is inclined relative to the wheel width direction is a second predetermined angle (θ2), the first predetermined angle (θ1) is equal to or smaller than the second predetermined angle (θ2).

According to the present invention in which the first predetermined angle (θ1) is equal to or smaller than the second predetermined angle (θ2), balance is achieved between the rigidity against a force transmitted to the vehicle wheel from outside to inside and the rigidity against a centrifugal force to the outside in the wheel radial direction.

In addition, the present invention is characterized in that the first predetermined angle (θ1) is approximately between 5° and 10°, both inclusive.

According to the present invention in which the first predetermined angle (θ1) is approximately between 5° and 10°, both inclusive, balance is achieved between the rigidity against a force transmitted to the vehicle wheel from outside to inside and the rigidity against a centrifugal force to the outside in the wheel radial direction. Note that it is preferable that the first predetermined angle (θ1) is approximately 8°.

Advantageous Effects of Invention

The present invention can provide a vehicle wheel allowing a sub-air chamber member to be suitably disposed along a curvy rim line, while creating a space portion for use in attachment of a tire to the wheel and not reducing the volume of a sub-air chamber.

DESCRIPTION OF EMBODIMENTS

Figure 1:
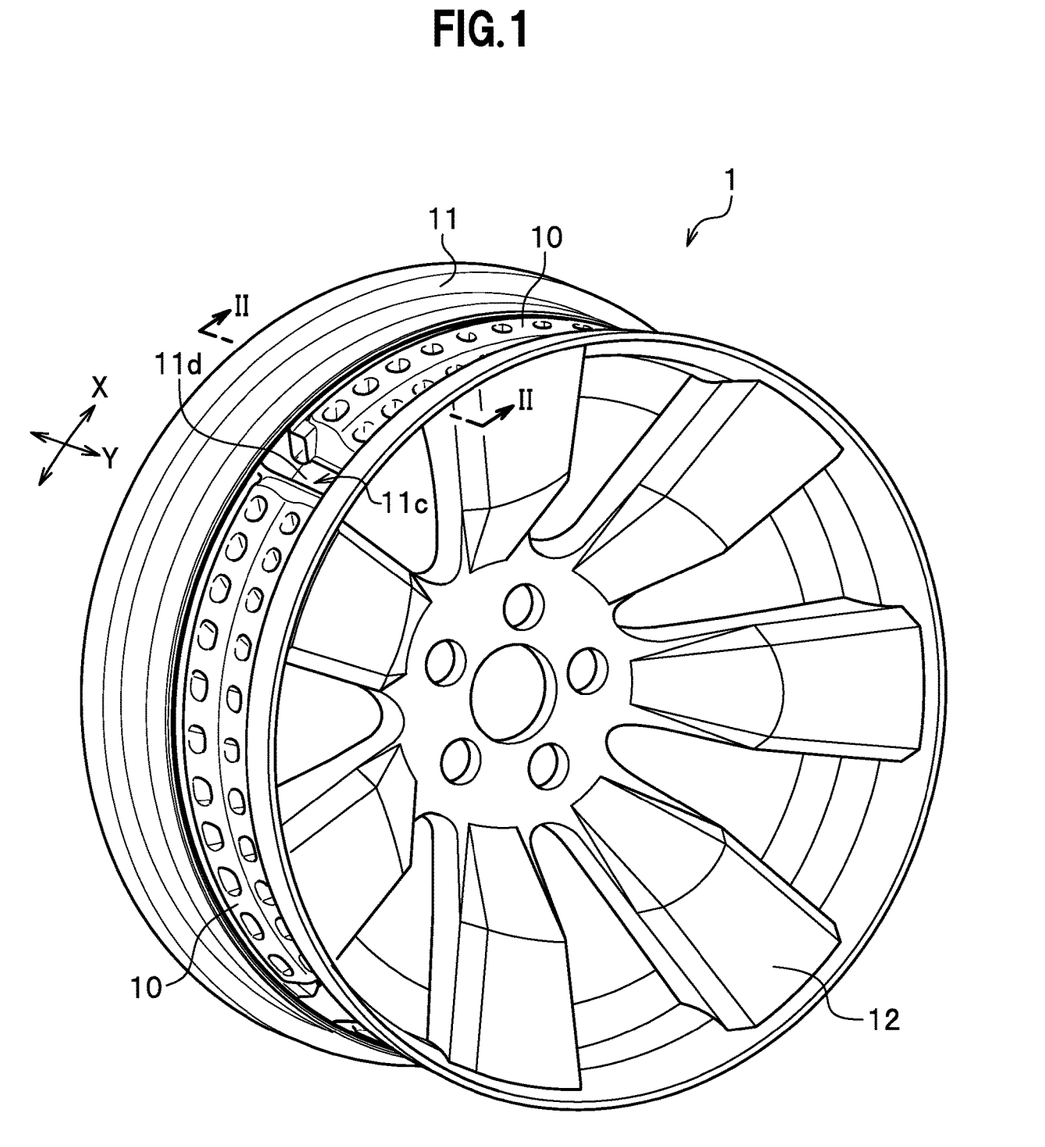
FIG. 1 is a perspective view of a vehicle wheel according to an embodiment of the present invention.

Next, an embodiment of the present invention is described in detail with reference to the drawings where necessary. FIG. 1 is a perspective view of a vehicle wheel according to an embodiment of the present invention. Note that throughout the drawings, "X" denotes the wheel circumferential direction, "Y" denotes the wheel width direction, and "Z" denotes the wheel radial direction.

As illustrated in FIG. 1, a vehicle wheel 1 according to the present embodiment has sub-air chamber members 10 as Helmholtz resonators which are spaced away from one another at equal intervals of space in the wheel circumferential direction X. In the present embodiment, four sub-air chamber members 10 are disposed along the wheel circumferential direction X of the vehicle wheel 1.

The vehicle wheel 1 includes a rim 11 and a disk 12 that links the rim 11 to a hub (not shown). The sub-air chamber members 10 are attached by being fitted onto the outer circumferential surface 11d of a well portion 11c of the rim 11.

Figure 2:
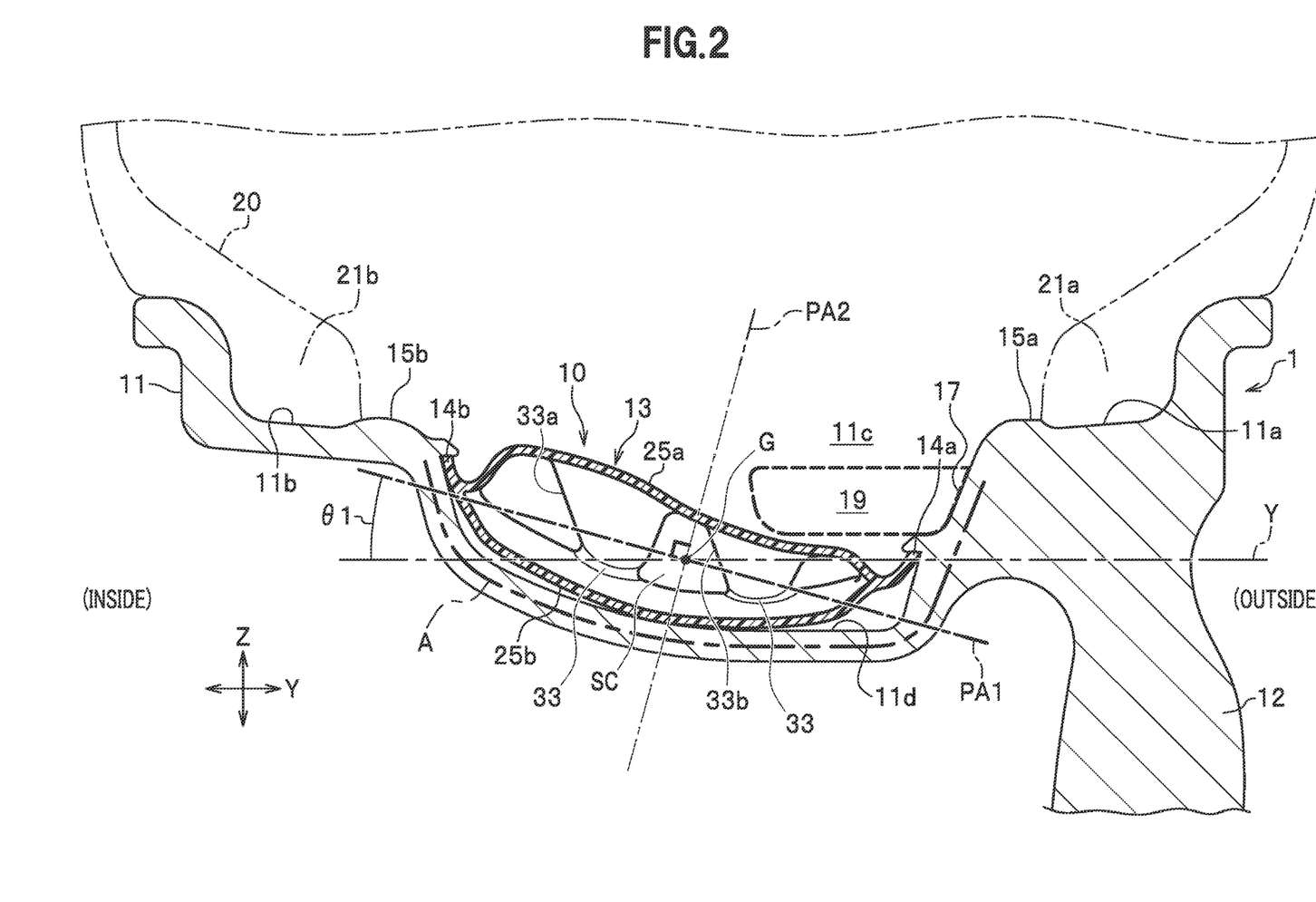
FIG. 2 is a partially-enlarged longitudinal sectional view taken along the line II-II in FIG. 1.
Figure 3:
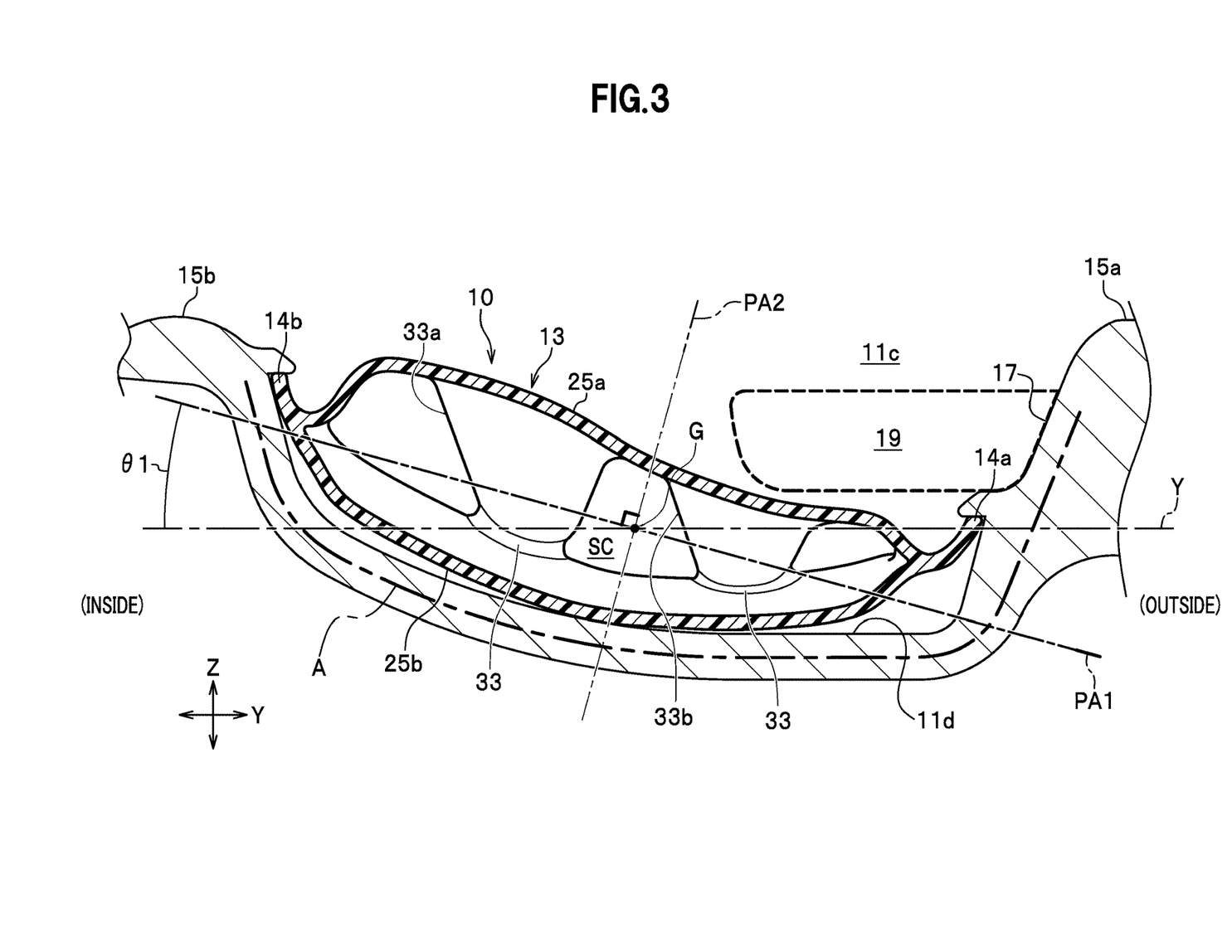
FIG. 3 is a partially-enlarged longitudinal sectional view of FIG. 2.

FIG. 2 is a partially-enlarged longitudinal sectional view taken along the line II-II in FIG. 1, and FIG. 3 is a partially-enlarged longitudinal sectional view of FIG. 2.

As illustrated in FIG. 2, the rim 11 has the well portion 11c between bead seats 11a, 11b which are formed at respective edge portions thereof in the wheel width direction Y, the well portion 11c being curved and recessed inward in the wheel radial direction Z (toward the rotation center).

Inward of the bead seats 11a, 11b in the wheel width direction Y, a pair of hump portions 15a, 15b are disposed facing each other, the hump portions 15a, 15b bulging outward in the wheel radial direction Z. Inward of the hump portion 15a in the wheel width direction Y, an inner wall surface 17 is formed inclining (down) from the hump portion 15a to the sub-air chamber member 10.

The well portion 11c is provided to allow bead portion 21a, 21b of a tire 20 to be seated into the rim 11 when the tire 20 is mounted to the rim 11.

As illustrated in FIG. 2, each sub-air chamber member 10 is a member long in one direction (see FIG. 1) and includes a hollow main body portion 13 having a sub-air chamber SC to be described later inside, and a pair of edge portions (a first edge portion, a second edge portion) 14a, 14b. The pair of edge portions 14a, 14b locks the sub-air chamber member 10 in the well portion 11c. On the section perpendicular to the axis in FIGS. 2 and 3, out of the pair of edge portions 14a, 14b, the outer edge portion 14a in the wheel width direction Y is positioned lower (more inward in the wheel radial direction Z or closer to the rotation center) than the inner edge portion 14b in the wheel width direction Y.

The sub-air chamber member 10 curves in its longitudinal direction and is configured to lie along the wheel circumferential direction X when attached to the outer circumferential surface 11d of the well portion 11c (see FIG. 1). The main body portion 13 has a tubular body (not shown) at an end portion in its longitudinal direction (i.e., the wheel circumferential direction X), and a communication hole (not shown) communicating with the sub-air chamber SC is formed inside the tubular body.

The sub-air chamber member 10 has a long rectangular shape in a plan view. As shown in FIGS. 2 and 3, the main body portion 13 of the sub-air chamber member 10 has a lower surface portion 25b which is a bottom plate disposed to lie along the outer circumferential surface 11d of the well portion 11c (see FIG. 1) and is formed of a curved surface recessed inward in the wheel radial direction Z in a sectional view taken in the wheel width direction Y. Note that the outer circumferential surface 11d of the well portion 11c is, as illustrated in FIG. 2, formed of a curved surface recessed inward in the wheel radial direction Z in a sectional view taken in the wheel width direction Y, like the lower surface portion 25b. In FIG. 3, the dot-dash heavy line A indicates a curvy rim line formed by a curve running in parallel with the curve of the curved surface of the lower surface portion 25b.

The main body portion 13 further includes: an upper surface portion 25a which is an upper plate disposed radially outside of the lower surface portion 25b and facing the lower surface portion 25b; and the sub-air chamber SC formed between the upper surface portion 25a and the lower surface portion 25b.

A space portion 19 (see the broken line in FIG. 2) is positioned above the upper surface portion 25a, the space portion 19 being formed by part of an outer portion of the upper surface portion 25a in the wheel width direction and the inner wall surface 17 of the well portion 11c. This space portion 19 is, as will be described later, an attachment space for facilitating attachment of the tire 20 to the vehicle wheel 1 (allowance space for mounting a tire). Although a resin material forming the upper surface portion 25a and a resin material forming the lower surface portion 25b have the same thickness in the present embodiment, their thicknesses may be different from each other.

The main body portion 13 of the sub-air chamber member 10 further includes the first edge portion 14a, the second edge portion 14b, and joint portions 33. The first edge portion 14a and the second edge portion 14b link the lower surface portion 25b and the upper surface portion 25a to each other at the respective sides in the width direction, and engage with the well portion 11c. The joint portions 33 partially join the upper surface portion 25a and the lower surface portion 25b to each other by being recessed from the upper surface portion 25a and the lower surface portion 25b to the inside of the sub-air chamber SC.

The upper surface portion 25a is positioned above the lower surface portion 25b which is disposed along the outer circumferential surface 11d of the well portion 11c and is curved in a projecting manner, thereby forming the sub-air chamber SC. The communication hole in the tubular body (not shown) disposed at the end portion of the main body portion 13 in the wheel circumferential direction X communicates with the sub-air chamber SC at one end side in the wheel circumferential direction X and is open to the outside at the other end side.

As illustrated in FIGS. 2 and 3, pairs of upper joint portions 33a, 33b arranged in the wheel width direction Y are formed in a part of the upper surface portion 25a forming the main body portion 13. Each pair of upper joint portions 33a, 33b is formed by the upper joint portion 33a at an inner side in the wheel width direction Y and the upper joint portion 33b at an outer side in the wheel width direction Y. These paired upper joint portions 33a, 33b are portions of the upper surface portion 25a being recessed toward the lower surface portion 25b, and are circular in a plan view. The pairs of upper joint portions 33a, 33b are arranged in two lines side by side in the width direction of the main body portion 13, the two lines running in the longitudinal direction of the sub-air chamber member 10 (i.e., the wheel circumferential direction X).

Pairs of lower joint portions (not shown) are formed at positions on the lower surface portion 25b that coincide with the pairs of upper joint portions 33a, 33b. The upper joint portions 33a, 33b and the lower joint portions together constitute the joint portions 33. The lower joint portions are portions of the lower surface portion 25b being recessed toward the upper surface portion 25a, and are circular in a bottom view. Tip end portions of the lower joint portions are integrated with tip end portions of the upper joint portions 33a, 33b of the upper surface portion 25a, thereby jointing the upper surface portion 25a and the lower surface portion 25b to each other partially.

The upper joint portions 33a, 33b and the lower joint portions joined to each other in the sub-air chamber SC improve mechanical strength of the sub-air chamber member 10 and reduce variation in the volume of the sub-air chamber SC to produce a muffling function.

On the lower surface portion side (the inner side in the wheel radial direction Z) of the main body portion 13, the lower surface portion 25b is partially recessed toward the upper surface portion 25a, and a bead (what is called a transverse bead) (not shown) extending in the wheel width direction Y is formed. The surface rigidity of the lower surface portion 25b is enhanced by this bead formed at locations in directions to link the inner lower joint portions 33b and the outer lower connection portion 34b.

A strong axis PA1 of the principal axes of a section of the sub-air chamber member 10 is inclined by a first predetermined angle θ1 relative to the wheel width direction Y (see the dot-dot-dash line in FIGS. 2 and 3). The strong axis PA1 of the principal axes of the section is inclined such that an inner side in the wheel width direction Y is positioned higher than an outer side in the wheel width direction Y. In other words, the strong axis PA1 of the principal axes of the section is formed of a inclined line which is inclined up such that the more inward in the wheel width direction Y, the more outward in the wheel radial direction Z.

Note that the "principal axes of a section" refer to a pair of two orthogonal axes which pass through the barycenter G of the section and have the maximum and minimum second moments of area, respectively, with respect to the axes. This pair of axes includes the strong axis PA1 and a weak axis PA2 having the maximum second moment of area and the minimum second moment of area, respectively, on the section orthogonal to the barycenter G of the section (a section perpendicular to the axis).

The vehicle wheel 1 according to the embodiment of the present invention is basically configured as above. Next, operation and advantageous effects of the vehicle wheel 1 are described.

First, the arrangement relation between the sub-air chamber member and the space portion is studied.

Figure 4A:
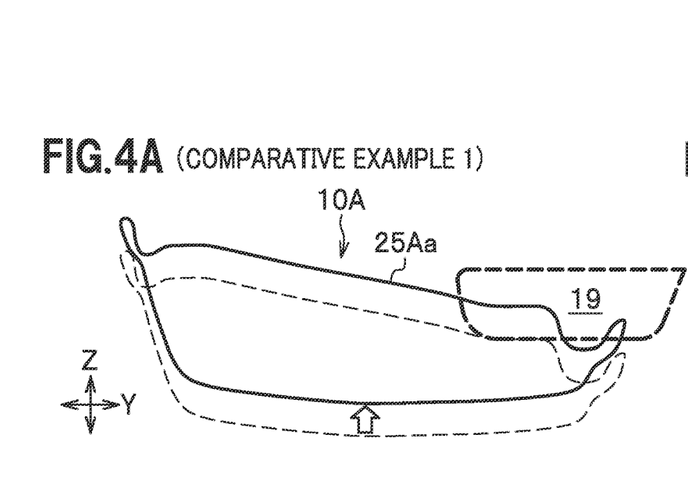
FIGS. 4A to 4D are schematic diagrams each illustrating the arrangement relation between a sub-air chamber member and a space portion, FIGS. 4A to 4C illustrating Comparative Examples 1 to 3, respectively, and FIG. 4D illustrating the present embodiment.
Figure 4B:
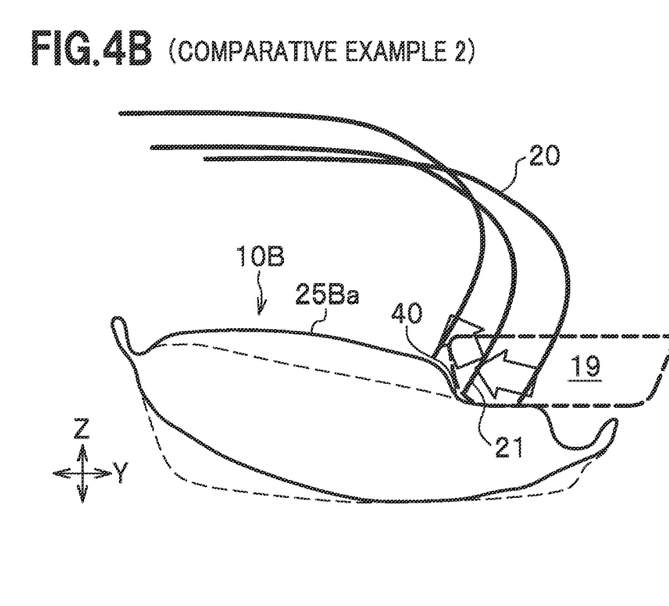
Figure 4C:
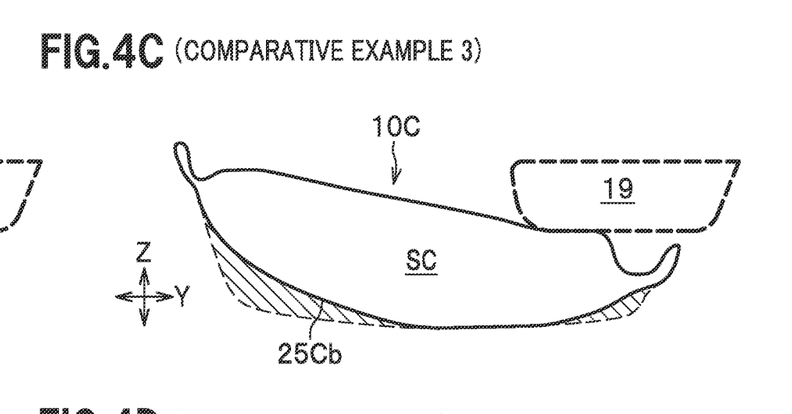
Figure 4D:
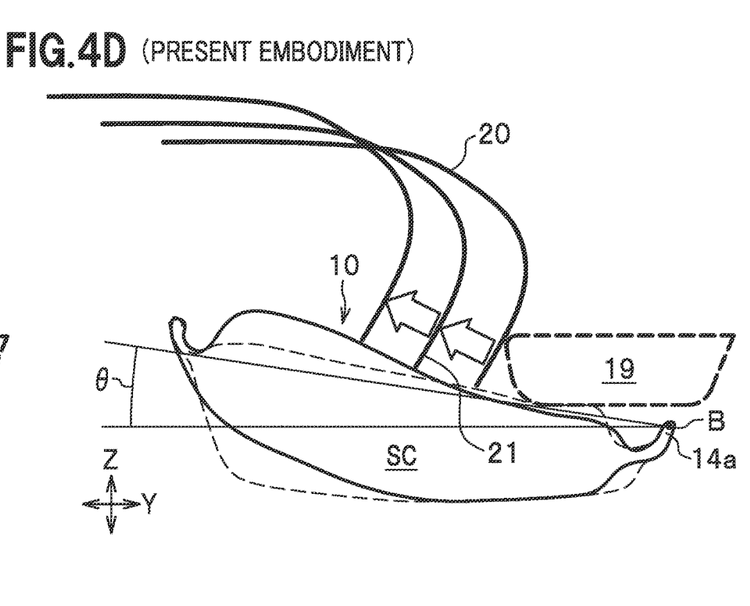

FIGS. 4A to 4D are schematic diagrams each illustrating the arrangement relation between the sub-air chamber member and the space portion, FIGS. 4A to 4C illustrating Comparative Examples 1 to 3, respectively, and FIG. 4D illustrating the present embodiment. Note that in FIGS. 4A to 4D, the original state is indicated by a broken line, and a displaced or deformed state is indicated by a solid line.

FIG. 4A illustrates Comparative Example 1 in which a sub-air chamber member 10A is displaced outward in the wheel radial direction Z in parallel (see the thick arrow). In Comparative Example 1, an outer portion of the an upper surface portion 25Aa of the sub-air chamber member 10A in the wheel width direction Y enters into the space portion 19, resulting in lower mountability of the tire 20 to the vehicle wheel 1.

FIG. 4B illustrates Comparative Example 2 in which a step 40 is provided in the an upper surface portion 25Ba of a sub-air chamber member 10B at a position facing the space portion 19, forming an odd-shaped section at an outer side and an inner side of the step 40 in the wheel width direction Y. In Comparative Example 2, the step 40 in the upper surface portion 25Ba lowers the rigidity of the upper surface portion 25Ba. Further, in Comparative Example 2, when the tire 20 is to be mounted to the vehicle wheel 1, the bead portions 21 of the tire 20 interfere with the step 40, lowering tire mountability.

FIG. 4C illustrates Comparative Example 3 in which a part of a lower surface portion 25Cb of a sub-air chamber member 10C (see the hatched part) is cut off to make a curve. In Comparative Example 3, the cutting off of the part of the lower surface portion 25Cb reduces the volume of the sub-air chamber SC and thus lowers the muffling effect.

FIG. 4D illustrates the present embodiment in which the sub-air chamber member 10 is inclined by being rotated clockwise by an angle θ about a center point B at the end of the edge portion 14a positioned at an outer side in the wheel width direction Y. The present embodiment allows the tire 20 to be mounted to the vehicle wheel 1 smoothly and efficiently, with the sub-air chamber SC having sufficient volume.

In the present embodiment, the strong axis (PA1) of the principal axes of a section of the sub-air chamber member 10 perpendicular to the axis of the sub-air chamber member 10 is inclined by the first predetermined angle (θ1) relative to the wheel width direction Y. Thus, the space portion 19 is created above an outer portion of the upper surface portion 25a, and also, the sub-air chamber SC can have sufficient volume. Balance of these two elements can be achieved.

Further, in the present embodiment in which the sub-air chamber member 10 is inclined, the sub-air chamber member 10 can be readily attached along the outer circumferential surface 11d (the rim line A) of the rim 11 curving inward in the wheel radial direction Z. As a result, the present embodiment enables the sub-air chamber member 10 to be suitably disposed along the curvy rim line A (see FIG. 2), while creating the space portion 19 for use in mounting of the tire 20 to the vehicle wheel 1 and not reducing the volume of the sub-air chamber SC.

Further, in the present embodiment, the strong axis (PA1) of the principal axes of a section is inclined such that the inner side in the wheel width direction Y is positioned higher than the outer side. For example, assume that an object collides with the vehicle wheel 1, and an impact load is transmitted from the inside to the outside of the vehicle wheel 1. Then, when the impact load is inputted to the sub-air chamber member 10, the sub-air chamber member 10 is pressed against the outer circumferential surface 11d of the curvy rim 11. Thus, the stress exerted on the sub-air chamber member 10 is distributed by the curvy lower surface portion 25b of the sub-air chamber members 10, and also, a force applied to portions of engagement between the sub-air chamber member 10 and the rim 11 (a force inputted to the pair of edge portions 14a, 14b) is reduced.

Furthermore, with the first predetermined angle (θ1) being in the range from 5° to 10° (5°≤θ1≤10°), the present embodiment achieves balance between the rigidity against a force transmitted to the vehicle wheel 1 from outside to inside and the rigidity against a centrifugal force to the outside in the wheel radial direction Z. Note that it is preferable that the first predetermined angle (θ1) is approximately 8° (θ1=8°).

Next, a description is given of a vehicle wheel according to a different embodiment of the present invention.

Figure 5:
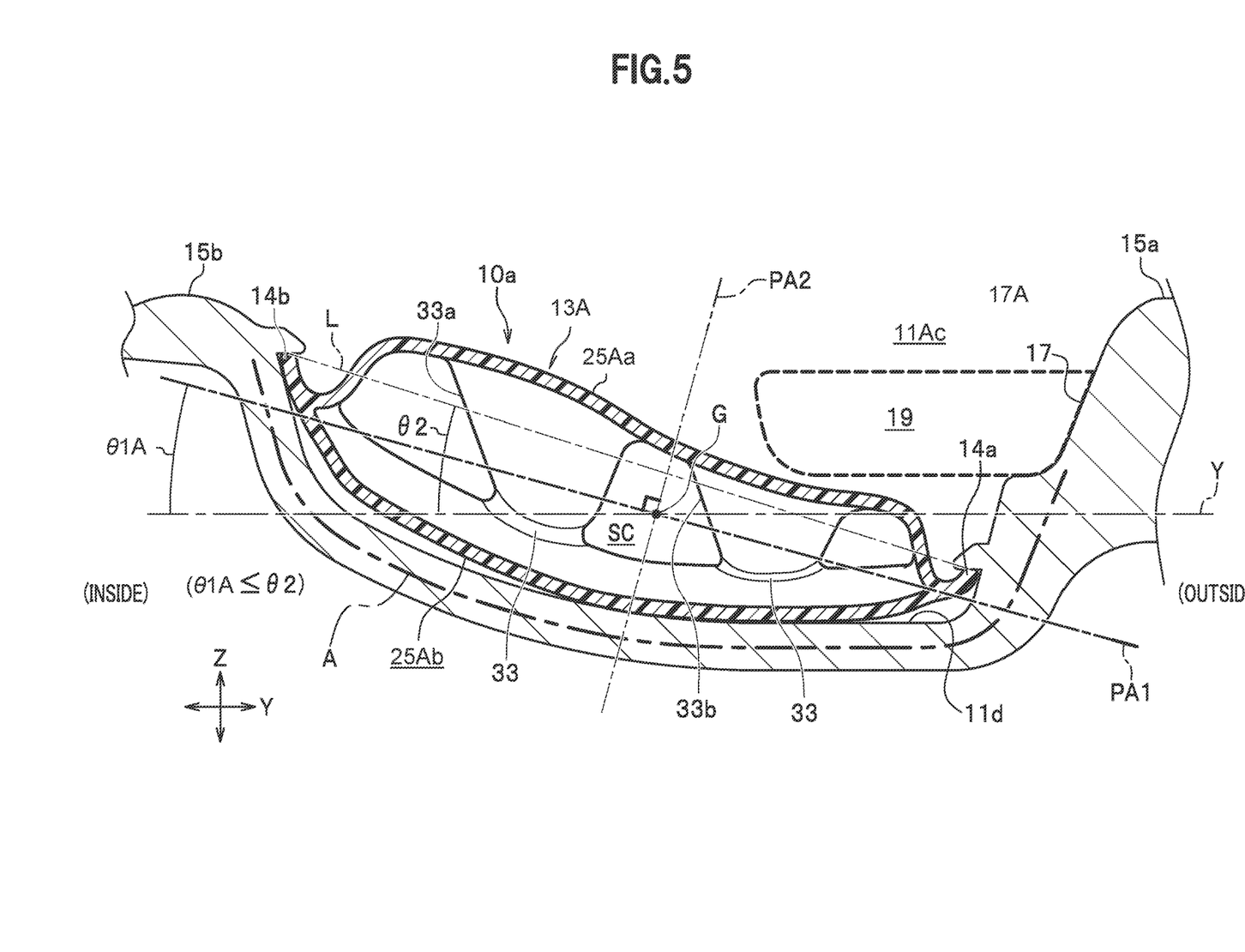
FIG. 5 is a main-part-enlarged sectional view of a sub-air chamber member incorporated in a vehicle wheel according to a different embodiment of the present invention.

FIG. 5 is a main-part-enlarged sectional view of a sub-air chamber member incorporated in the vehicle wheel according to the different embodiment of the present invention. Note that in the different embodiment, the same constituents as those of the sub-air chamber member 10 illustrated in FIGS. 2 and 3 are denoted by the same reference numerals as used in FIGS. 2 and 3, and will not be described in detail again. To this end, unless otherwise disclosed, a sub-air chamber member 10a includes a well portion 11Ac, a main body portion 13A, an inner wall surface 17A, an upper surface portion 25Aa, a lower surface portion 25Ab, and a first predetermined angle 81A that respectively have similar features and function in a similar manner as the well portion 11c, the main body portion 13, the inner wall surface 17, the upper surface portion 25a, the lower surface portion 25b, and the first predetermined angle 81 of the sub-air chamber member 10.

In a section of the sub-air chamber member 10a perpendicular to the axis of the sub-air chamber member 10a, the sub-air chamber member 10a of the present embodiment sets an imaginary straight line L (see the dot-dot-dash line in FIG. 5) passing through the tip of the outer first edge portion 14a and the tip of the inner second edge portion 14b. This imaginary straight line L is inclined by a second predetermined angle (θ2) relative to the wheel width direction Y. The imaginary straight line L is inclined such that the inner side in the wheel width direction Y is positioned higher than the outer side. In other words, the imaginary straight line L connecting the tips of the paired edge portions 14a, 14b is formed by a inclined line which is inclined up such that the more inward in the wheel width direction Y, the more outward in the wheel radial direction Z.

In the present embodiment, the first predetermined angle (θ1A) of the strong axis PA1 of the principal axes of a section is equal to or below the second predetermined angle (θ2) of the imaginary line L (θ1A≤θ2). Thus, the present embodiment can achieve balance between the rigidity against a force transmitted to the vehicle wheel 1 from outside to inside and the rigidity against a centrifugal force to the outside in the wheel radial direction Z.

REFERENCE SIGNS LIST 1 vehicle wheel
10, 10a sub-air chamber member (Helmholtz resonator)
11c well portion
11d outer circumferential surface
14a, 14b edge portions (first edge portion, second edge portion)
17 inner wall surface
19 space portion
25a upper surface portion
25b lower surface portion
SC sub-air chamber
PA1 strong axis of principal axes of section
L imaginary straight line
θ1 first predetermined angle
θ2 second predetermined angle
A rim line

The invention claimed is:

1. A vehicle wheel comprising:
a sub-air chamber member of a Helmholtz resonator attached to an outer circumferential surface of a well portion,
wherein the sub-air chamber member comprises:
a lower surface portion disposed proximate to the outer circumferential surface of the well portion;
an upper surface portion disposed radially outside of the lower surface portion;
a sub-air chamber formed between the upper surface portion and the lower surface portion; and
a first edge portion and a second edge portion that connect the lower surface portion and the upper surface portion to each other at respective sides in a width direction and engage with the well portion,
wherein a space portion is positioned above the upper surface portion, the space portion being formed by a part of the upper surface portion and an inner wall surface of the well portion,
wherein the sub-air chamber has a cross-section perpendicular to an axis of the sub-air chamber,
wherein the cross-section has principal axes having a strong axis which inclines at a first predetermined angle relative to a wheel width direction,
wherein when an inclination angle at which an imaginary straight line passing through the first edge portion and the second edge portion is inclined relative to the wheel width direction is a second predetermined angle, the first predetermined angle is equal to or smaller than the second predetermined angle, and
wherein the strong axis inclines to the wheel width direction in a same direction as the imaginary straight line inclines to the wheel width direction.

2. The vehicle wheel set forth in claim 1, wherein the first predetermined angle is approximately between 5° and 10°, both inclusive.

* * * * *